US005514730A

United States Patent [19]
Mazurek et al.

[11] Patent Number: 5,514,730
[45] Date of Patent: May 7, 1996

[54] RADIATION-CURABLE ACRYLATE/SILICONE PRESSURE-SENSITIVE ADHESIVE COMPOSITIONS

[75] Inventors: Mieczyslaw H. Mazurek, Roseville; Steven S. Kantner, St. Paul; David J. Kinning, Woodbury, all of Minn.; Yvan A. Bogaert, Ghent, Belgium

[73] Assignee: Minnesota Mining and Manufacturing Company, Saint Paul, Minn.

[21] Appl. No.: 279,718

[22] Filed: Jul. 25, 1994

Related U.S. Application Data

[63] Continuation of Ser. No. 672,342, Mar. 20, 1991, abandoned.

[51] Int. Cl.$^6$ .......................... C09J 183/02; C09J 183/07
[52] U.S. Cl. ...................... 522/99; 522/71; 522/74; 522/79; 522/80; 522/83; 523/111; 525/477; 525/479; 525/925; 528/25; 528/26; 528/28; 528/32; 521/154; 526/279; 526/931
[58] Field of Search ...................... 522/99, 79, 80, 522/84, 83; 525/477, 479, 925; 523/111; 528/25, 26, 28, 32; 521/154; 526/279, 931

[56] References Cited

U.S. PATENT DOCUMENTS

| | | | |
|---|---|---|---|
| Re. 24,906 | 12/1960 | Ulrich | 206/59 |
| 2,676,182 | 4/1954 | Daudt et al. | 260/448.2 |
| 2,736,721 | 2/1956 | Dexter | 260/42 |
| 2,857,356 | 10/1958 | Goodwin et al. | 260/42 |
| 3,577,264 | 4/1971 | Nordstrom | 117/93.31 |
| 3,676,192 | 7/1972 | Hahn | 117/93.31 |
| 3,878,263 | 4/1975 | Martin | 260/825 |
| 3,887,669 | 6/1975 | Pillet | 264/16 |
| 3,928,499 | 12/1975 | Tomalia et al. | 260/885 |
| 3,983,298 | 9/1976 | Hahn et al. | 428/355 |
| 4,070,526 | 1/1978 | Colquhoun et al. | 428/537 |
| 4,100,318 | 7/1978 | McCann et al. | 428/159 |
| 4,117,028 | 9/1978 | Hahn | 260/835 |
| 4,130,708 | 12/1978 | Friedlander et al. | 528/28 |
| 4,136,250 | 1/1979 | Mueller et al. | 528/29 |
| 4,153,641 | 5/1979 | Deichert et al. | 260/827 |
| 4,158,617 | 6/1979 | Eldred | 204/159 |
| 4,181,752 | 1/1980 | Martens et al. | 427/54.1 |
| 4,201,808 | 5/1980 | Cully et al. | 428/40 |
| 4,223,067 | 9/1980 | Levens | 428/308 |
| 4,276,402 | 6/1981 | Chromecek et al. | 526/264 |
| 4,293,397 | 10/1981 | Sato et al. | 204/159.13 |
| 4,304,705 | 12/1981 | Heilmann et al. | 260/30.4 |
| 4,309,520 | 1/1982 | Blizzard | 525/447 |

(List continued on next page.)

FOREIGN PATENT DOCUMENTS

| | | | |
|---|---|---|---|
| 0152179 | 6/1985 | European Pat. Off. | C08L 83/07 |
| 0170219 | 2/1986 | European Pat. Off. | A61C 9/00 |
| 0250093 | 12/1987 | European Pat. Off. | C09J 3/14 |
| 0250248 | 12/1987 | European Pat. Off. | C08G 77/54 |
| 0289928 | 4/1988 | European Pat. Off. | C09J 3/14 |
| 0332400 | 9/1988 | European Pat. Off. | C08L 83/14 |
| 0289929 | 11/1988 | European Pat. Off. | C09J 3/14 |
| 0308216 | 3/1989 | European Pat. Off. | C09J 7/02 |
| 0378420 | 7/1990 | European Pat. Off. | C08L 83/08 |
| 0390207 | 10/1990 | European Pat. Off. | C08F 259/08 |
| 0421643 | 4/1991 | European Pat. Off. | C08L 83/08 |
| 2507196 | 12/1982 | France | C09J 7/02 |
| 2596676 | 10/1987 | France | B05D 5/10 |
| 60-197780 | 10/1985 | Japan | C09J 3/14 |

(List continued on next page.)

OTHER PUBLICATIONS

Silicone Pressure Sensitive Adhesives for High Performance Applications, Thomas J. Tangney, Dow Corning Corporation, Midland, MI, Sep. 1986.
Formulating Silicone Pressure Sensitive Adhesives for Application Performance, Loretta A. Sobieski, Dow Corning Corporation, Midland, MI, May 1986 pp. 2–6.
Dow Corning Silicone Pressure Sensitive Adhesives, Product Information, Q2–7406 Adhesives 1986.
Dow Curning Silicone Pressure Sensitive Adhesives, Application Information, Q2–7470 and Q2–7407 Adhesives pp. 009–014.
Silicones, *Enc. of Polym. Sci. & Eng.*, 2nd Ed., vol. 15, pp. 296–297.
Silicones, *Enc. of Polym. Sci. & Eng.*, 1st Ed., pp. 541, 544–552.
X. Yu, S. L. Cooper, et al., *J. Appl. Poly. Sci.*, 30, 2115 (1985).
Adhesives Age, Mar. 1979, pp. 39–41.
Dialog Abstract—JP 63291969 Incomplete (first page only) Nov. 1988.
Adhesive Coatings Technology—Tech Seminar Jun. 1980 pp. 197–200.
Bull. Chem. Soc. Japan 41(10) 2521 (1968).
American Society for Testing & Materials Publication ASTM D3654–78.
Pressure Sensitive Tape Council Publication PSTC–7 (Shear Adhesion).
Pressure Sensitive Tape Council Publication PSTC–1 (Nov. 1975) (Peel Adhesion).
EP 58909 Abstract.
EP 159683 Abstract.
WO8807931 Abstract.

*Primary Examiner*—Susan W. Berman
*Attorney, Agent, or Firm*—Gary L. Griswold; Walter N. Kim; Janice L. Dowdall

[57] ABSTRACT

The present invention provides a radiation curable vinyl-silicone pressure-sensitive adhesive composition which combines the advantages of silicone and acrylate pressure-sensitive adhesives and which does not experience gross phase separation problems. The composition comprises at least about 20 weight percent of a certain telechelic silicone polymer, about 0.5 to about 80 weight percent of monofunctional free-radically polymerizable vinyl monomer copolymerizable with the silicone polymer, and a sufficient amount of a silicate MQ tackifying resin to impart a degree of adhesive tack to the cured composition at the use temperature, wherein the weight percentages of the silicone polymer and the monomer are based upon the total weight of the silicone polymer and monomer.

23 Claims, No Drawings

U.S. PATENT DOCUMENTS

| | | | |
|---|---|---|---|
| 4,330,590 | 5/1982 | Vesley | 428/336 |
| 4,348,454 | 9/1982 | Eckberg | 428/334 |
| 4,364,972 | 12/1982 | Moon | 427/54.1 |
| 4,369,300 | 1/1983 | Carter et al. | 528/28 |
| 4,370,358 | 1/1983 | Hayes et al. | 427/54.1 |
| 4,391,687 | 7/1983 | Vesley | 204/159 |
| 4,477,326 | 10/1984 | Lin | 204/159 |
| 4,477,548 | 10/1984 | Harasta et al. | 430/14 |
| 4,503,208 | 3/1985 | Lin et al. | 528/15 |
| 4,504,629 | 3/1985 | Lien et al. | 525/288 |
| 4,518,794 | 5/1985 | Boutevin et al. | 560/192 |
| 4,528,081 | 7/1985 | Lein et al. | 204/159 |
| 4,554,339 | 11/1985 | Hockemeyer et al. | 528/26 |
| 4,558,111 | 12/1985 | Tolentino | 528/26 |
| 4,561,950 | 12/1985 | Leo | 522/91 |
| 4,563,539 | 1/1986 | Gornowicz et al. | 556/421 |
| 4,568,566 | 2/1986 | Tolentino | 427/54.1 |
| 4,575,545 | 3/1986 | Nakos et al. | 526/242 |
| 4,575,546 | 3/1986 | Klemarczyk et al. | 526/245 |
| 4,584,355 | 4/1986 | Blizzard et al. | 525/477 |
| 4,585,836 | 4/1986 | Homan et al. | 525/477 |
| 4,587,276 | 5/1986 | Lien et al. | 522/34 |
| 4,587,363 | 5/1986 | Ohta et al. | 526/75 |
| 4,591,622 | 5/1986 | Blizzard et al. | 525/477 |
| 4,595,471 | 6/1986 | Preiner et al. | 522/29 |
| 4,597,987 | 7/1986 | Hockemeyer et al. | 427/54.1 |
| 4,603,086 | 7/1986 | Fujii et al. | 428/447 |
| 4,608,270 | 8/1986 | Varaprath | 427/35 |
| 4,675,346 | 6/1987 | Lin et al. | 522/39 |
| 4,678,846 | 7/1987 | Weitemeyer et al. | 525/477 |
| 4,693,776 | 9/1987 | Krampe et al. | 156/327 |
| 4,693,935 | 9/1987 | Mazurek | 428/352 |
| 4,698,406 | 10/1987 | Lo et al. | 528/12 |
| 4,726,982 | 2/1988 | Traynor et al. | 428/213 |
| 4,741,966 | 5/1988 | Cavezzan | 428/447 |
| 4,742,103 | 5/1988 | Morita et al. | 524/174 |
| 4,748,043 | 5/1988 | Seaver et al. | 427/30 |
| 4,774,297 | 9/1988 | Murakami et al. | 525/478 |
| 4,777,276 | 10/1988 | Rasmussen et al. | 5567/419 |
| 4,791,163 | 12/1988 | Traver et al. | 524/506 |
| 4,831,070 | 5/1989 | McInally et al. | 524/267 |
| 4,831,080 | 5/1989 | Blizzard et al. | 525/100 |
| 4,839,206 | 6/1989 | Waldenberger | 428/40 |
| 4,894,259 | 1/1990 | Kuller | 427/208.8 |
| 4,895,738 | 1/1990 | Zimmerman et al. | 427/208.8 |
| 4,898,920 | 2/1990 | Lee et al. | 525/477 |
| 4,906,695 | 3/1990 | Blizzard et al. | 525/100 |
| 4,911,986 | 3/1990 | Keryk et al. | 522/99 |
| 4,943,613 | 7/1990 | Arai et al. | 524/773 |
| 4,943,620 | 7/1990 | Gomyo et al. | 525/474 |
| 5,006,593 | 4/1991 | Brasure et al. | 524/520 |
| 5,237,082 | 4/1993 | Leir et al. | 428/447 |
| 5,264,278 | 11/1993 | Mazurek et al. | 428/317.3 |
| 5,308,887 | 5/1994 | Ko et al. | 522/148 |
| 5,314,748 | 5/1994 | Mazurek et al. | 428/447 |

FOREIGN PATENT DOCUMENTS

| | | | |
|---|---|---|---|
| 61-57355 | 12/1986 | Japan | C09J 3/14 |
| 62-24771 | 1/1987 | Japan | C09J 7/02 |
| 62-295982 | 12/1987 | Japan | C09J 7/02 |
| 63-291971 | 11/1988 | Japan | C09J 3/14 |
| 1-245078 | 9/1989 | Japan | C09J 7/02 |
| 1-245079 | 9/1989 | Japan | C09J 7/02 |
| 2-1785 | 1/1990 | Japan | C09J 133/06 |
| 2-274783 | 11/1990 | Japan | C09J 7/02 |
| 1323869 | 7/1973 | United Kingdom | C08G 47/02 |
| 2039287 | 8/1980 | United Kingdom | C08G 77/04 |
| 2084598 | 9/1980 | United Kingdom | C08L 83/06 |
| 2109390 | 6/1983 | United Kingdom | C08G 77/26 |
| WO90/10028 | 9/1990 | WIPO | C08G 77/20 |

RADIATION-CURABLE ACRYLATE/SILICONE PRESSURE-SENSITIVE ADHESIVE COMPOSITIONS

This is a continuation of application Ser. No. 07/672,342 filed Mar. 20, 1991, now abandoned.

FIELD OF THE INVENTION

This invention relates to radiation curable vinyl-silicone pressure sensitive adhesives (PSAs) and to PSA coated sheet materials.

BACKGROUND OF THE INVENTION

Both acrylate pressure sensitive adhesives and silicone pressure sensitive adhesives (PSAs) are known, and both have been found useful for a variety of purposes. Each, however, possesses certain disadvantages. For example, acrylate PSAs generally have poor low temperature flexibility and poor high temperature stability, and exhibit poor adhesion to low energy surfaces. Silicone PSAs, on the other hand, have excellent weatherability, are flexible at low temperature and stable at high temperatures, and exhibit excellent adhesion to low energy surfaces, but are costly, low in tack, and lacking in solvent resistance. Attempts have been made to provide "hybrid" systems having the advantages of each, but the approach generally taken has been to blend the two types of PSAs. Thus, these hybrids are prone to gross phase separation problems and their properties are also somewhat limited. In addition, the systems are solvent-based or water-based, necessitating a drying step.

For example, European Patent Publication No. 289928 (General Electric), published Nov. 9, 1988, describes an emulsion or solution comprising: (a) 100 parts by weight of water or organic solvent; (b) from about 10 to about 400 parts by weight of pressure sensitive adhesive comprising: (i) from about 50 to about 99% by weight organic pressure sensitive adhesive, preferably an acrylate, and (ii) from about 1 to about 50% by weight of silicone pressure sensitive adhesive; and (c) an effective amount of organic peroxide or alkoxy silane cross-linking agent to increase the shear strength of the composite adhesive through crosslinking of the silicone. The emulsion generally requires the use of an emulsifying agent or agents to maintain both the micelles of silicone adhesive and micelles of organic adhesive in a substantially stable state of suspension even at low water content, so that drying may be accomplished prior to gross phase separation of the silicone adhesive and the organic adhesive.

Similarly, U.S. Pat. No. 4,791,163 (Traver et al.) discloses an emulsion (formed from a silicone PSA and an organic PSA, preferably an acrylate) comprising: (a) 100 parts by weight of a continuous phase of water; (b) from about 10 to about 400 parts by weight of micelles comprising: (i) from about 50 to about 99% by weight of micelles comprising organic pressure sensitive adhesive, preferably an acrylate, and (ii) from about 1 to about 50% by weight of micelles comprising silicone pressure sensitive adhesive; and (c) an amount of emulsifying agent effective to maintain the emulsion. Curing of the silicone may be promoted by adding a peroxide or by adding a catalyst and an alkoxy silane.

Japanese Patent Publication No. 62-295982 (Toyota Gosei), published Dec. 23, 1987, describes organic solvent-based blends of silicone pressure sensitive adhesive, active hydrogen containing acrylic pressure sensitive adhesive, and polyurethane and/or polyisocyanate.

Japanese Patent Publication No. 60-197780 (Daicel), published Oct. 7, 1985, also discloses blends in organic solvent of 100 parts by weight acrylic pressure sensitive adhesive and 1–30 parts by weight silicone pressure sensitive adhesive.

Japanese Patent Publication Nos. 59-145269 (Nitto), published Aug. 20, 1984, and 63-291971 (Nitto), published Nov. 29, 1988, seek to avoid the gross phase separation problems characteristic of blends through the use of either bridging agents or compatibilizing agents. The former publication describes a composition comprising a medium, 100 parts by weight of acrylic adhesive polymer dissolved or dispersed in the medium, 5–120 parts by weight silicone adhesive polymer, and crosslinking agent capable of co-bridging both polymers. The latter publication discloses pressure sensitive adhesives comprising silicone pressure sensitive adhesive, polyacrylate pressure sensitive adhesive, and silicone polyacrylate graft copolymer.

A need thus exists for a hybrid PSA system which has the advantages of both acrylate PSAs and silicone PSAs which requires little or no solvent, thereby reducing or eliminating the environmental and health hazards associated with solvent use, as well as the need for drying. A need also exists for such a hybrid PSA system which is radiation curable and which, unlike most known hybrid systems, is not prone to gross phase separation problems. A need also exists for a hybrid PSA system which possesses balanced PSA properties tailorable over a wide range, thereby providing greater flexibility than known hybrid systems in achieving substrate-specific adhesion. We have discovered such a hybrid PSA system.

SUMMARY OF THE INVENTION

We have discovered a superior hybrid PSA system which combines the advantages of both silicone and acrylate PSAs and which does not experience the gross phase separation problems which have plagued blended systems. The superior hybrid PSA system is environmentally advantageous in that the amount of solvent employed is drastically reduced or altogether eliminated which is also advantageous in terms of the reduction of potential health hazards sometimes associated with the use of such solvents. The system is also advantageous in that it can be prepared by the radiation curing of the PSA composition of the invention and that the need for a drying step is reduced or eliminated due to the solvent reduction or elimination.

The hybrid PSA system of the invention possesses balanced PSA properties tailorable over a wide range, thus providing greater flexibility than known hybrid systems in achieving substrate-specific adhesion.

The present invention provides a radiation curable pressure sensitive adhesive composition comprising:

(a) at least about 20 weight percent of polymer selected from the group consisting of polymers falling within the general formula:

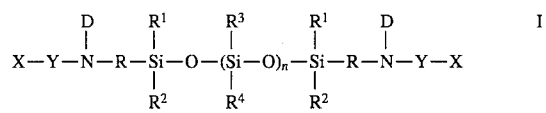

and mixtures thereof, wherein:

X are monovalent moieties having ethylenic unsaturation which can be the same or different;

Y are divalent linking groups which can be the same or different and which serve to activate X toward free radical polymerization;

D are monovalent moieties which can be the same or different selected from the group consisting of hydrogen, an alkyl group of 1 to about 10 carbon atoms, aryl, and substituted aryl;

R are divalent hydrocarbon groups which can be the same or different;

$R^1$ are monovalent moieties which can be the same or different selected from the group consisting of alkyl, substituted alkyl, aryl, and substituted aryl;

$R^2$ are monovalent moieties which can be the same or different selected from the group consisting of alkyl, substituted alkyl, aryl, and substituted aryl;

$R^3$ are monovalent moieties which can be the same or different selected from the group consisting of alkyl, substituted alkyl, vinyl, aryl, and substituted aryl;

$R^4$ are monovalent moieties which can be the same or different selected from the group consisting of alkyl, substituted alkyl, vinyl, aryl, and substituted aryl; and n is an integer of about 200 to about 1000;

(b) about 0.5 to about 80 weight percent of monofunctional free radically polymerizable vinyl monomer which is capable of copolymerizing said polymer; and (c) a sufficient amount of a silicate MQ tackifying resin to impart a degree of adhesive tack to the cured composition at the use temperature;

wherein said weight percentages set forth in elements (a) and (b) are based upon the total weight of said polymer of element (a) and said monomer of element (b).

The radiation-curable PSA composition can further comprise one or more of the following: crosslinker in the form of one or more multifunctional acrylate monomers, crosslinker in the form of one or more organopolysiloxanes according to the formula

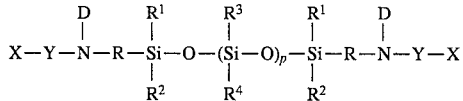

wherein p is an integer of about 35 to about 199, and X, Y, D, R, $R^1$, $R^2$, $R^3$ and $R^4$ are as defined above; initiator; filler; solvent; and a second tackifying resin for the vinyl phase ultimately formed from the free radically polymerizable vinyl monomer. The cured version of the PSA composition is also provided, as well as PSA-coated sheet materials.

Copolymerization of free radically polymerizable vinyl, preferably acrylate, monomer(s) and terminally difunctional, i.e., telechelic, silicone(s) produces a hybrid vinyl/ siloxane PSA which does not have the gross phase separation problems of most known PSA blends. Since the two components are chemically bound, a microphase separated domain morphology results, which can be reliably produced and which has enhanced stability relative to known blends of two or more immiscible polymers. Since gross phase separation does not occur, the hybrid PSAs of the invention avoid problems which are characteristic of the known blends, e.g., lack of reproducibility in application of the coating solution, product variability resulting from a dependence of morphology on drying rate, and changes in product performance after coating and drying due to rearrangement of domain structure, both in the bulk and at the surface, with aging.

A wide variety of free radically polymerizable vinyl monomers can be utilized, including even "high $T_g$ vinyl monomers, i.e, monomers which as homopolymers are unsuited for use as PSAs due to their having glass transition temperatures of greater than about −20° C. The properties of the PSA composition of the invention can be tailored over a wide range through variation in the nature(s) and amount(s) of the free radically polymerizable monomer(s) and in the molecular weight(s) and amount(s) of difunctional silicone(s). Thus, in comparison with known systems, this invention provides increased flexibility in achieving good adhesion to specific low energy or high energy surfaces. Other advantages of the hybrid PSA composition of the invention include reduction or elimination of solvent and, thus, of drying procedures, and, as a radiation-curable system, the ability to cure without damage to heat sensitive substrates.

DETAILED DESCRIPTION OF THE INVENTION

Telechelic silicones suitable for use in the PSA composition of the invention are those represented by Formula I above, which can be prepared by reaction of an organopolysiloxane diamine represented by the general formula

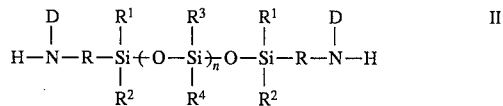

wherein n, R, $R^1$, $R^2$, $R^3$, $R^4$, and D are as defined above, with an electrophile having ethylenic unsaturation, X, and such other functionality that, upon reaction with the organopolysiloxane diamine, not only a terminal X group but also an amide, substituted amine, urea, or urethane moiety is provided. Examples of the types of functionality required in such electrophilic compounds include acid halide, acid anhydride, cyclic anhydride, and azlactones, each of which provides an amide moiety upon reaction with the diamine, epoxy or acrylate, each of which provides a substituted amine moiety, and isocyanate, which provides a urea moiety.

Preferably, X comprises

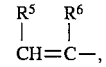

wherein $R^5$ is selected from the group consisting of hydrogen and —COOH and $R^6$ is selected from the group consisting of hydrogen, methyl, and —CH$_2$COOH Most preferably, $R^5$ comprises hydrogen and $R^6$ is selected from the group consisting of hydrogen and methyl. The reaction can be carried out at a temperature of about −10° C. to about 50° C. and under atmospheric pressure by combining the diamine and the electrophile while providing appropriate mixing. A nonreactive organic solvent can be used as a diluent but is not necessary, and the two reactants can be charged into the reaction vessel in any order. Alternatively, an organopolysiloxane diamine according to Formula II above can be reacted first with a compound containing two electrophilic groups, e.g., a diisocyanate, (or with a compound such as phosgene) and the resultant product reacted in a second step with a nucleophile, e.g., an amine or an alcohol, to provide terminally difunctional silicone according to Formula I. When an alcohol such as hydroxyethyl acrylate, hydroxyethyl methacrylate, or hydroxypropyl methacrylate is utilized, the product organopolysiloxane contains urethane moieties.

The divalent linking group Y is generated upon reaction of the electrophile with the diamine and is chosen so as to activate the ethylenically unsaturated monovalent X group towards free radical polymerization, particularly free radical copolymerization with the vinyl monomer(s) of element (b). The Y group accomplishes this by changing the electron density of X. Y is selected from, for example, the group of structures containing aromatic moieties which when bound to X yield vinyl pyridinyl or styrenic-type functionalities; structures containing carboxyl moieties which when bound to X at the oxygen side yield vinyl ester and isopropenyl ester-type functionalities; structures containing carboxyl moieties which when bound to X at the carbonyl side yield acrylate, methacrylate, maleate, fumarate, and itaconate-type functionalities; structures containing carboxamide moieties which when bound to X at the nitrogen side yield N-vinyl amide and N-isopropenyl amide-type functionalities; and structures containing carboxamide moieties which when bound to X at the carbonyl side yield acrylamide, methacrylamide, and maleimide-type functionalities. A special example of this final structure is when Y comprises a carbonyl group which depending upon the nature of X can result in acrylamide, methacrylamide, beta-carboxy acrylamide, or maleimide functionality.

The letter n, as indicated previously, represents an integer of about 200 to about 1000, preferably about 270 to about 700.

Organopolysiloxane diamines useful in the preparation of the telechelic silicones of this invention can be prepared in various ways. In a first method, an organopolysiloxane terminated at both chain ends with hydroxy groups, as represented by the general formula

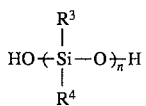

III where $R^3$, $R^4$, and n are as defined above, can be subjected to a condensation reaction with a compound represented by the general formula

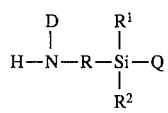

IV where D, R, $R^1$, and $R^2$ are as defined above and Q is a hydroxy group or a hydrolyzable group. A second method involves the reaction of a cyclic organosiloxane, represented by the general formula

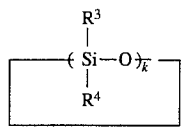

V where $R^3$ and $R^4$ are as defined above and k is a positive integer of 3 to 8, with an amine functional endblocker, represented by the general formula

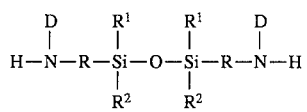

VI where D, R, $R^1$, and $R^2$ are as defined above, in the presence of a basic catalyst such as tetramethylammonium hydroxide or triorganosilanolate. A third method, a modification of the second, is preferred and involves running the reaction in two stages utilizing a minimum amount of an essentially anhydrous amino alkyl functional silanolate catalyst represented by the general formula

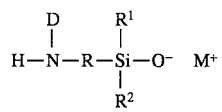

VII where D, R, $R^1$, and $R^2$ are as defined above and $M^+$ is a cation selected from the group consisting of $K^+$, $Na^+$, and tetraorganoammonium ion, with $N(CH_3)_4^+$ being preferred. In the first stage of the reaction, a low molecular weight organopolysiloxane diamine, represented by the general formula

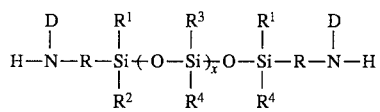

VIII where D, R, $R^1$, $R^2$, $R^3$, and $R^4$ are as defined above and x is an integer of about 4 to about 40, is prepared by reacting an amine functional disiloxane endblocker represented by Formula VI above with a cyclic organosiloxane represented by Formula V in the presence of a catalytic amount of essentially anhydrous amino alkyl functional silanolate represented by Formula VII in an inert atmosphere such as nitrogen or argon. The preferred catalyst for use in this reaction is 3-aminopropyl dimethyl tetramethylammonium silanolate, which can be obtained as a crystalline solid from the reaction of one molar equivalent of 1,3-bis(3-aminopropyl) tetramethyldisiloxane with two molar equivalents of tetramethylammonium hydroxide pentahydrate in tetrahydrofuran under reflux, followed by drying under vacuum for five hours (0.1 mm Hg) at 60° C. The amount of catalyst employed should be less than about 0.05 percent, preferably about 0.005 to about 0.03 percent, by weight of the resultant organopolysiloxane diamine of Formula II. The reaction can be carried out in bulk at a temperature of 80°–90° C., and under these conditions is usually complete in about 0.5–2 hours, as judged by substantially complete disappearance of the endblocker in the reaction mixture as determined by vapor phase chromatography. The second stage of the reaction involves the slow addition of the remainder of the cyclic organosiloxane required to achieve the desired molecular weight. This addition is preferably carried out dropwise at such a rate that the cyclic organosiloxane is incorporated into the polymer about as fast as it is added, usually in about five to seven hours at the reaction temperature of 80°–90° C. By utilizing this two-stage method with a minimum amount of essentially anhydrous catalyst, organopolysiloxane diamines represented by Formula II above can be consistently prepared having excellent difunctionality with little contamination from monofunctional and nonfunctional polysiloxane impurities.

Preferred organopolysiloxane diamines for use in preparing the telechelic silicones of this invention are those for which n is an integer of about 270 to about 700, R is selected from the group consisting of alkylene of one to about twelve carbon atoms, alkylarylene, and arylene, $R^1$ and $R^2$ are independently selected from the group consisting of alkyl of one to about twelve carbon atoms, substituted alkyl of one to about twelve carbon atoms, aryl, and substituted aryl, $R^3$ and $R^4$ are at least 50% methyl with the remainder selected from the group consisting of alkyl of two to about twelve carbon atoms, substituted alkyl of two to about twelve carbon atoms, vinyl, aryl, and substituted aryl, and D is hydrogen. Such a range of molecular weights provides the best balance of properties in the PSA compositions. Most preferably, R is alkylene of one to about twelve carbon atoms and $R^1$, $R^2$, $R^3$, and $R^4$ are methyl, as polydimethylsiloxanes are the most readily available, the most inert, and provide the greatest adhesion to low energy surfaces.

Examples of electrophiles suitable for reaction with organopolysiloxane diamines to produce the telechelic silicones of the invention include but are not limited to isocyanatoethyl methacrylate; alkenyl azlactones such as vinyl dimethyl azlactone and isopropenyl dimethyl azlactone; m-isopropenyl-α, α-dimethyl benzyl isocyanate; glycidyl methacrylate; acryloyl ethyl carbonic anhydride; maleic anhydride; and multifunctional acrylates such as hexanediol diacrylate and trimethylolpropane triacrylate. Some electrophiles, e.g., isocyanatoethyl methacrylate, are commercially available, and others can be prepared via literature methods. Alkenyl azlactones and their preparation are described in U.S. Pat. No. 4,777,276 (Rasmussen et al.), the disclosure of which is incorporated herein by reference. Acryloyl ethyl carbonic anhydride can be prepared from ethyl chloroformate and acrylic acid by the method of R. Hatada and H. Kondo given in *Bull. Chem. Soc. Japan* 41 (10), 2521(1968), the disclosure of which is also incorporated herein by reference. A description of the preparation of acrylol ethyl carbonic anhydride according to Hatada et al. is set forth in the Examples. Conditions for reaction of amines with multifunctional acrylates in a Michael addition reaction are described in U.S. Pat. No. 4,603,086, incorporated by reference herein. Preferred electrophiles are those which react under relatively mild conditions with the organopolysiloxane diamine and include those selected from the group consisting of isocyanatoethyl methacrylate; m-isopropenyl-α,α-dimethylbenzyl isocyanate; vinyl dimethyl azlactone; acryloyl ethyl carbonic anhydride; and maleic anhydride.

A preferred telechelic silicone for use in the PSA composition of the invention comprises the organopolysiloxane of Formula I wherein
X comprises

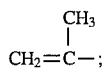

Y comprises

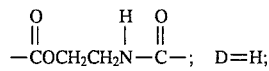

R comprises —$CH_2CH_2CH_2$—; and $R^1$, $R^2$, $R^3$, $R^4$ each comprise —$CH_3$.

Another preferred organopolysiloxane comprises the organopolysiloxane of Formula I wherein X comprises $CH_2$=CH—; Y comprises

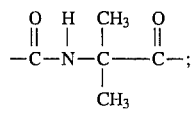

D=H; R comprises —$CH_2CH_2CH_2$—; and $R^1$, $R^2$, $R^3$, $R^4$ each comprise —$CH_3$.

Another preferred organopolysiloxane comprises the organopolysiloxane of Formula I wherein X comprises $CH_2$=CH—; Y comprises

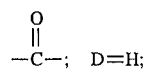

R comprises —$CH_2CH_2CH_2$—; and $R^1$,$R^2$, $R^3$, and $R^4$ each comprise —$CH_3$.

Another preferred organopolysiloxane comprises the organopolysiloxane of Formula I wherein X comprises

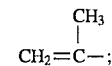

Y comprises

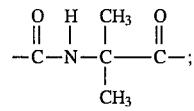

D=H; R comprises —$CH_2CH_2CH_2$—; and $R^1$, $R^2$, $R^3$, and $R^4$ each comprise —$CH_3$.

Another preferred organopolysiloxane comprises the organopolysiloxane of Formula I wherein X comprises

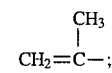

Y comprises

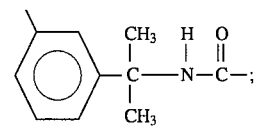

D=H; R comprises —$CH_2CH_2CH_2$—; and $R^1$, $R^2$, $R^3$, and $R^4$ each comprise —$CH_3$.

Free Radically Polymerizable Vinyl Monomer

Monofunctional free radically polymerizable vinyl monomers suitable for use in the PSA compositions of the invention are those which can copolymerize with the telechelic silicones. Such monomers should be capable of reacting with the X moieties of the telechelic silicones in order for copolymerization to occur. A wide variety of monomers are useful in the practice of this invention. Useful monomers include but are not limited to the following: acrylic acid, methacrylic acid, esters of acrylic acid comprising 4 to 21 carbon atoms, esters of methacrylic acid comprising 5 to 21 carbon atoms, acrylamide, substituted acrylamides such as N,N-dimethyl acrylamide, styrene, substituted styrenes such as vinyl toluene, acrylonitrile, methacrylonitrile, N-vinyl pyrrolidone, N-vinyl caprolactam, vinylidene chloride, vinyl esters of carboxylic acids, and mixtures thereof. Such monomers are known in the art, and many are commercially available. Preferred monofunctional monomers are selected from the group consisting of acrylic acid, methacrylic acid, acrylonitrile, esters of acrylic acid comprising 4 to 21 carbon atoms, N,N-dimethyl acrylamide, N-vinyl pyrrolidone, and mixtures thereof. These monomers give rapid cure rates and a wide variation in specific adhesion performance of the resultant PSA. Most preferred monomers are selected from the group consisting of acrylic acid, methacrylic acid, butyl acrylate, hydroxyethyl acrylate, hydroxypropyl acrylate, 2-carboxyethyl acrylate, ethoxyethyl acrylate, perfluorooctyl acrylate, isooctyl acrylate, and mixtures thereof, due to their low volatility.

The radiation curable PSA composition of the invention can be prepared by combining at least about 20 percent by weight, preferably about 25 to about 98 percent by weight, most preferably about 25 to about 90 percent by weight of one or more telechelic silicones represented by Formula I above, from about 0.5 to about 80 percent by weight, preferably about 2 to about 75 percent by weight, and most preferably about 10 to about 75 percent by weight of one or more monofunctional vinyl monomers, wherein said percentages by weight are based upon the total weight of said telechelic silicone and said monofunctional vinyl monomer, and a sufficient amount of a silicate MQ tackifying resin to impart to the cured composition a degree of adhesive tack at the use temperature, e.g., from about 80 to about 200, preferably about 80 to about 150, most preferably about 90 to about 120, parts by weight resin to 100 parts by weight telechelic silicone for tack at room temperature. Such resins are disclosed in U.S. Pat. Nos. 4,370,358; 3,983,298; 2,676,182; 2,736,721; and 4,791,163, all of which are incorporated by reference herein, and are commercially available as approximately 50 to 60 weight percent solutions in solvents such as toluene or xylene.

The vinyl monomers and telechelic silicones can be added to the MQ resin solution to provide a high solids, e.g., a 60–80 weight percent solids, composition which can be coated on a substrate, cured by exposure to electron beam, visible, or ultraviolet radiation, and then dried to effect solvent removal. Alternatively, the drying step can precede the curing step either before or after coating, provided that the vinyl monomers are less volatile than the solvent. In the former case, a 100 weight percent solids composition is obtained which can then be coated or extruded and cured. A 100 weight percent solids composition can also be obtained by stripping the solvent from the MQ resin, combining the resin and the vinyl monomer(s), and then adding the telechelic silicone, or by diluting the MQ resin solution with low volatility vinyl monomer and distilling or vacuum stripping the solvent either before or after adding the telechelic silicone.

Curing of the PSA composition in the presence of solvent, e.g., the MQ resin solvent or, optionally, other solvent, can enhance the miscibility of the telechelic silicone/MQ resin/vinyl monomer mixture, leading to improved copolymerization, and can also affect the PSA properties. By varying the amount of solvent, i.e., varying the degree of swelling, controlled variation in PSA properties can be achieved.

Suitable solvents include those which do not interfere with the copolymerization of the polymer of Formula I and the vinyl monomer. Examples of suitable solvents include ethyl acetate, cyclohexane, hexane, heptane, toluene, butyl acetate, octamethylcyclotetrasiloxane, and the like. Such nonpolar, aprotic solvents are preferred.

Curing of the hybrid PSA composition should be carried out in as oxygen-free an environment as possible, e.g., in an inert atmosphere such as nitrogen gas or by utilizing a barrier of radiation-transparent material having low oxygen permeability. When visible or ultraviolet radiation is used for curing, the composition also contains photoinitiator. Suitable photoinitiators include benzoin ethers, benzophenone and derivatives thereof, acetophenone derivatives, camphorquinone, and the like. Photoinitiator is generally used at a concentration of from about 0.1% to about 5% by weight of the adhesive composition. If desired, the PSA composition of the invention can also be cured thermally, requiring the use of thermal initiator, such as those selected from the group consisting of peroxides (i.e. lauryl peroxide, etc.), azo compounds (i.e. azo-bis-isobutyronitrile, etc.), persulfates (i.e. sodium persulfate and potassium persulfate, etc.), and the like, generally at a concentration of from about 0.5% to about 5% by weight of the adhesive composition.

In addition to the technique of curing in a swollen state, controlled variation of PSA properties can be achieved by including crosslinker(s) in the PSA composition. Low molecular weight difunctional organopolysiloxane represented by Formula Ia above can optionally be utilized as crosslinker, and desired properties can then be obtained via variation in the nature, molecular weight, and amount of the material added. Such low molecular weight difunctional silicone can be prepared by the methods described above and, when included in the PSA composition, serves to modify the crosslink density and, thereby, the shear adhesion characteristics of the cured composition. When the adhesive composition optionally further comprises such low molecular weight difunctional silicone as crosslinker, the amount of low molecular weight difunctional silicone preferably does not exceed about 30 weight percent, of the adhesive composition. When utilized, the amount of low molecular weight difunctional silicone preferably comprises from about 2 to about 30 weight percent, most preferably from about 5 to about 20 weight percent, of the total weight of the adhesive composition.

One or more multifunctional acrylates such as 1,6-hexanediol diacrylate, 1,4-butanediol diacrylate, trimethylolpropane triacrylate, and 1,6-hexanediol dimethacrylate can also be used as crosslinker, alone or in combination with low molecular weight silicone. The term "multifunctional" as used herein to describe a compound refers to a compound having at least two functional groups. The amount of acrylate crosslinker preferably does not exceed about 2 weight percent of the total weight of the adhesive composition. When utilized, the amount of acrylate crosslinker preferably comprises from about 0.05 to about 2 weight percent, most preferably about 0.05 to about 0.5 weight percent, of the total weight of the adhesive composition. If the concentration of crosslinker is too high, the cured PSA composition has a high crosslink density (i.e., low molecular weight between crosslinks) resulting in poor tack and peel adhesion properties.

When utilized, the addition of up to about 30 weight percent, preferably from about 2 to about 30 weight percent, and most preferably about 2 to about 20 weight percent, based upon the total weight of the adhesive composition, of monofunctional siloxane macromolecular monomer, represented by Formula IX below wherein q is an integer selected from the group consisting of 0 and 1; s is an integer selected from the group consisting of 1, 2, and 3; r is an integer of about 35 to about 700; $R^7$ is a monovalent moiety which can be the same or different selected from the group consisting of alkyl, substituted alkyl, alkoxy, alkylamino, hydroxyl, aryl, and substituted aryl; and X; Y; D; R; $R^2$; $R^3$; and $R^4$; are as defined above; alone or in combination with low molecular weight difunctional silicone, yields PSAs with increased tack, i.e., improved "finger appeal".

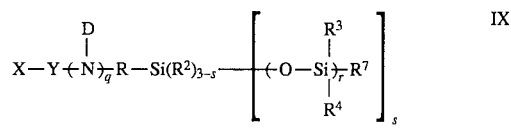

The hybrid PSA composition of the invention can be frothed to make a foam, using an inert gas such as nitrogen in order to form a hybrid PSA composition having gas bubbles dispersed throughout. A foam-like appearance can also be obtained by addition of fillers such as glass or plastic microbubbles for example, about 25 to about 75 percent by volume of the adhesive composition. The composition can also contain silica filler for modification of PSA properties, e.g., at levels up to about 15 percent by weight of the adhesive composition. When utilized, the amount of silica filler is preferably about 0.5 to about 15 weight percent, most preferably about 0.5 to about 5 weight percent. Either hydrophilic or hydrophobic silica can be utilized, but hydrophobic silica is preferred due to its reduced tendency to "structure", i.e., to hydrogen bond with the polysiloxane and form an elastic mass prior to cure. Such structuring can impede normal processing operations such as extrusion.

Other common non-copolymerizable additives such as pigments, dyes, quartz powder, glass fibers, calcium carbonate, flame retardants, thermal stabilizers, polymerization inhibitors, plasticizers, adhesion promoters, and the like can also be included in the PSA composition.

If desired, tackifier for the vinyl phase can be included to further modify the properties of the cured PSA. When utilized, the tackifier typically comprises up to about 100 parts by weight, more preferably from about 5 to about 100 parts by weight, and most preferably from about 10 to about 70 parts by weight, per 100 parts by weight of the free radically polymerizable vinyl monomer. Examples of such tackifiers include those selected from the group consisting of rosin acids, rosin esters, synthetic aromatic resins, synthetic aliphatic resins, terpene resins, and mixtures thereof.

The hybrid PSA composition of the invention, depending on its viscosity, can be coated via any of a variety of conventional coating methods, such as roll coating, knife coating, or curtain coating, or can be extruded. The composition can be applied to at least a portion of at least one major surface of suitable flexible or inflexible backing materials and cured to produce PSA-coated sheet materials. Useful flexible backing materials include paper, plastic films such as poly(propylene), poly(ethylene), poly(vinyl chloride), poly(tetrafluoroethylene), polyester [e.g., poly(ethylene terephthalate)], polyimide film such as DuPont's Kapton™, cellulose acetate, and ethyl cellulose. Backings can also be of woven fabric formed of threads of synthetic or natural materials such as cotton, nylon, rayon, glass, or ceramic material, or they can be of nonwoven fabric such as air-laid webs of natural or synthetic fibers or blends of these. In addition, suitable backings can be formed of metal, metallized polymeric film, or ceramic sheet material. The PSA-coated sheet materials can take the form of any article conventionally known to be utilized with PSA compositions, such as labels, tapes, transfer tapes (comprising a film of the PSA borne on at least one release liner), signs, covers, marking indices, and the like. Primers can be utilized, but they are not always necessary.

EXAMPLES

The invention is further illustrated by the following examples, in which all parts or percentages in each Example and the rest of the Specification are by weight unless otherwise stated.

Test Methods

The test methods used to evaluate the PSA-coated flexible sheet materials of the examples are industry standard tests. The standard tests are described in various publications of the American Society for Testing and Materials (ASTM), Philadelphia, Pennsylvania, and the Pressure Sensitive Tape Council (PSTC), Glenview, Ill., and are detailed below. The reference source of each of the standard test methods is also given.

Shear Strength (Reference: ASTM D3654-78; PSTC-7)

The shear strength is a measure of the cohesiveness or internal strength of an adhesive. It is based upon the amount of force required to pull an adhesive strip from a standard flat surface in a direction parallel to the surface to which it has been affixed with a definite pressure. It is measured in terms of the time (in minutes) required to pull a standard area of adhesive coated sheet material from a stainless steel test panel under stress of a constant, standard load.

The tests were conducted on adhesive-coated strips applied to a stainless steel panel such that a 12.7 mm by 12.7 mm portion of each strip was in firm contact with the panel with one end portion of the tape being free. The panel with coated strip attached was held in a rack such that the panel formed an angle of 178° with the extended tape free end which was then tensioned by application of a force of one kilogram applied as a hanging weight from the free end of the coated strip. The 2° less than 180° was used to negate any peel forces, thus insuring that only the shear forces were measured, in an attempt to more accurately determine the holding power of the tape being tested. The time elapsed for each tape example to separate from the test panel was recorded as the shear strength. Unless otherwise noted, all shear failures reported herein were cohesive failures of the adhesive.

Peel Adhesion (Reference: ASTM D3330-78; PSTC-1 (11/75))

Peel adhesion is the force required to remove a coated flexible sheet material from a test panel measured at a specific angle and rate of removal. In the examples, this force is expressed in Newtons per 100 mm (N/100mm) width of coated sheet. The procedure followed was:
1. A 12.7 mm width of the coated sheet was applied to the horizontal surface of a clean glass test plate with at least 12.7 lineal cm in firm contact. A 2 kg hard rubber roller was used to apply the strip.
2. The free end of the coated strip was doubled back nearly touching itself so the angle of removal was 180°. The free end was attached to the adhesion tester scale.
3. The glass test plate was clamped in the jaws of a tensile testing machine which was capable of moving the plate away from the scale at a constant rate of 2.3 meters per minute.
4. The scale reading in Newtons was recorded as the tape was peeled from the glass surface. The data is reported as the average of the range of numbers observed during the test.

Tack

The tack of these adhesives was qualitatively assessed by a "finger appeal" test and assigned a value of low, medium, or high. On this scale Scotch™ brand Magic™ transparent tape (available from Minnesota Mining and Manufacturing Company) has a rating of high.

Preparation of Functional Silicones

Difunctional polysiloxanes terminated on both ends with ethylenically unsaturated groups were prepared as described below. These are identified in the examples and in the tables as 5K ACMAS, 10K ACMAS, 13K ACMAS, 21K ACMAS, 35K ACMAS, 52K ACMAS, 35K ACMS, 35K MACMAS, 20K MAHAS, 35K CACMS, 35K MAUS, and 30K MeStUS, wherein the number denotes molecular weight in thousands and the letters indicate the type of functionality as defined below.

Abbreviations

MAUS–methacryloxyurea siloxane
ACMAS–acrylamidoamido siloxane
MACMAS–methacrylamidoamido siloxane
MeStUS–α-methylstyrylurea siloxane
ACMS–acrylamido siloxane
CACMS–β-carboxyacrylamido siloxane
MAHAS–methacryloxyhydroxyamino siloxane Synthesis of difunctional precursors for all free-radically polymerizable siloxanes described in this application was performed in the following way:

Aminopropyl-Terminated Polydimethylsiloxane

A 1 liter 3-necked round bottom flask equipped with thermometer, mechanical stirrer, dropping funnel, and dry argon inlet was charged with 4.25 g bis(3-aminopropyl) tetramethyldisiloxane end-blocker and 21.25 g of octamethylcyclotetrasiloxane ($D_4$) which had been previously purged for 10 minutes with argon. The flask contents were heated to 80° C. with an oil bath, and a trace (about 0.03 to 0.05 g) of catalyst—anhydrous 3-aminopropyl dimethyl tetramethylammonium silanolate—was added via a spatula. The flask contents were stirred at 80° C. and after 30 minutes of stirring had become quite viscous. Vapor phase chromatography (VPC) showed that the end-blocker had completely disappeared. To the resultant reaction mixture (which consisted of a 1,500 molecular weight polysiloxane with aminopropyl endgroups, cyclic siloxanes and active catalyst) was added dropwise over a six hour period 656 g of argon-purged $D_4$, resulting in a further rise in the viscosity. Heating of the flask contents at 80° C. was continued overnight. The catalyst was decomposed by heating at 150° C. for ½ hour, and the product was stripped at 140° C. at 0.1 mm Hg pressure until no more volatiles distilled (ca. 1½ hour), resulting in 585 g of a clear, colorless, viscous oil (a yield of 86% of theoretical). The molecular weight of the product determined by acid titration was 35,088. Using this procedure, but varying the ratio of endblocker to $D_4$, aminopropyl-terminated polydimethylsiloxanes with molecular weights of 5,000, 10,000, 13,000, 20,000, 21,000, and 52,000 were prepared.

5K, 10K, 13K, 21K, 35K ACMAS

Polydimethylsiloxane terminated on both ends with acrylamidoamido groups and having an average molecular weight of about 35,000 (35K ACMAS) was prepared by thoroughly mixing 350 g (0.01 mole) of aminopropyl-terminated polydimethylsiloxane prepared according to the above description with 2.8 g (0.02 mole) of vinyldimethylazlactone (VDM), prepared as described in U.S. Pat. No. 4,777,276 (Rasmussen et al.), incorporated by reference herein, at room temperature.

The viscosity of the reaction mixture increased as the reaction progressed. The number average molecular weight of the difunctional polysiloxane was determined by acid titration of the precursor and was confirmed by gel permeation chromatography (GPC) analysis before and after capping with VDM. 5K ACMAS, 10K ACMAS, 13K ACMAS, 21K ACMAS, and 52K ACMAS were prepared by using aminopropyl-terminated polydimethylsiloxane precursors with molecular weights of 5,000, 10,000, 13,000, 21,000 and 52,000 respectively, prepared according to the above-described procedure.

35K MAUS/35K MACMAS/35K MeStUS/35K ACMS

Other free-radically polymerizable siloxanes were prepared by reacting the 35,000 molecular weight aminopropyl-terminated polydimethylsiloxane prepared according to the above-described method with other capping agents, such as with isocyanatoethyl methacrylate, commercially available from Showa Rhodia, isopropenyl dimethyl azlactone, prepared as described in U.S. Pat. No. 4,777,276 (Rasmussen et al.), incorporated by reference herein, and with m-isopropenyl-α,α-dimethyl benzyl isocyanate available from American Cyanamid under the trade name m-TMI™, at room temperature to form polysiloxanes with methacryloxyurea (35K MAUS), methacrylamidoamido (35K MACMAS), and α-methylstyryl urea (35K MeStUS) groups on both ends, respectively. 35,000 MW acrylamido functional siloxane (35K ACMS) was prepared by adding a solution of 0.80 g (5.5 mmol) acryloyl ethyl carbonic anhydride (prepared from ethyl chloroformate and acrylic acid according to the method of R. Hatada and H. Kondo, Bull. Chem. Soc. Japan, 41 (10),2521 (1968)), incorporated by reference herein, in 5 mL $CH_2Cl_2$ to 87.5 g (2.5 mmol) 35,000 MW degassed aminopropyl-terminated polydimethylsiloxane (prepared according to the above-described method) in a 250 mL round bottom flask, stirring 30 minutes at room temperature under nitrogen, and distilling off solvent on a rotary evaporator.

The preparation of acryloyl ethyl carbonic anhydride according to Hatada et al. is set forth below.

Into a 500 mL 2-neck round bottom flask equipped with a mechanical stirrer and self-venting addition funnel with attached nitrogen inlet was placed 100 g dichloromethane, 30 g (0.28 mole) ethyl chloroformate, and 10.7 g (0.27 mole) NaH as a 60% mineral oil dispersion. The head space was purged with nitrogen and resulting suspension cooled in an ice bath. 1 g of pyridine was added followed by dropwise addition of 19.2 g (0.27 mole) acrylic acid over 30 minutes to the well stirred cooled solution. The cooling bath was removed and the solution was agitated an additional 2 hours, then quenched by addition of 49 mL 5% aqueous HCl (i.e., 7 mL concentrated HCl diluted with 42 mL deionized water). The mixture was transferred to a separatory funnel, and the organic layer separated, washed one time with 20 mL deionized water, and dried over $MgSO_4$. After filtration, a small amount of phenothiazine (ca. 0.05g) was added as inhibitor, and the solvent was stripped using a rotary evaporator as aspirator vacuum and room temperature. The resulting two phase material (produce and mineral oil) was transferred to a distillation apparatus and simple distilled under reduced pressure (bp 60° C. at 0.05 mmHg) to yield product.

20K MAHAS

A polysiloxane with methacryloxyhydroxypropylamino (20K MAHAS) groups on both ends was prepared utilizing the procedure described in Example 4 of U.S. Pat. No. 4,293,397, incorporated by reference herein. 40.34 g (2 mmol) degassed 20,171 MW amine terminated polydimethylsiloxane synthesized as described above was placed in a 250 mL 2-neck flask containing 1.47 g (10.3 mmol) glycidyl methacrylate and 9.4 mg methoxyhydroquinone. An overhead stirrer and a nitrogen inlet were attached, the headspace was flushed with nitrogen, and the reaction mixture was stirred for 65 hours at 60° C.

35K CACMS 35,000 MW β-carboxyacrylamido functional siloxane (35K CACMS) was prepared by charging 99.9 g (2.9 mmol)

degassed 35,000 MW aminopropyl-terminated polydimethylsiloxane (prepared according to the above-described method), 0.62 g (6.3 mmol) maleic anhydride, 1.15 g (11.4 mmol) triethyl amine, and 125 g methylene chloride into a 500 mL round bottom flask under nitrogen, stirring 18.5 hours at room temperature, then refluxing 2.5 hours at 40° C., and distilling off solvent and triethyl amine on a rotary evaporator.

13K ACMASmac n-Butyl lithium (13.3 mL, 2.5 M) was added to 9.8 g octamethylcyclotetrasiloxane ($D_4$) under argon to form lithium silanolate initiator. After stirring for 30 minutes, a solution of 500 g hexamethylcyclotrisiloxane ($D_3$) in 1500 g dry tetrahydrofuran was added and the flask contents were stirred at room temperature for 18 hours. To the resulting viscous syrup was added 4.7 g 3-aminopropyldimethyl fluorosilane terminating agent.

The fluorosilane terminating agent was prepared according to the following method: a 500 mL, 3-neck round bottom flask was charged with 49.6 g 1,3-bis(3-aminopropyl)tetramethyldisiloxane, 29.6 g ammonium fluoride, and 300 mL cyclohexane. While heating under reflux, water was removed by means of a Dean-Stark trap. After 18 hours, 4.4 mL of water had been collected, and the clear, colorless solution was transferred while warm to a 500 mL 1-neck round bottom flask. The solvent was distilled off on a rotary evaporator to provide 165 grams of white solid. This was dissolved in 200 mL of methylene chloride, 30 g of hexamethyldisilazane was added, and the mixture was stirred and heated under reflux for 5 hours. The flask was fitted for distillation and the solvent removed under aspirator vacuum. The product was distilled (boiling point of 70° C.) at aspirator vacuum to provide 3-aminopropyldimethyl fluorosilane as a clear, colorless oil. The yield was 54 g (100%), which was determined to be pure by vapor phase chromatography. The structure was confirmed by NMR spectroscopy.

After the fluorosilane terminating agent was added, the viscosity rapidly decreased. After stirring for 2 hours, the solvent was distilled off on a rotary evaporator. The product was filtered to remove lithium fluoride and provided 516 g of silicone monoamine as a clear, colorless oil. Titration with 0.1N HCl gave a number average molecular weight, $M_n$, of 13,000 (theoretical $M_n$= 15,000) 49.6 g (3.8 mmol) of this monoamine was reacted with 0.52 g (3.7 mmole) VDM at room temperature to yield monofunctional acrylamidoamido-terminated polydimethylsiloxane (13K ACMASmac).

The vinyl monomers used in preparation of the hybrid PSAs described in the Examples below are listed below along with their source.

| MONOMERS | | |
|---|---|---|
| Abbrev. | Monomer | Source |
| AA | acrylic acid | Rohm and Haas |
| ACN | acrylonitrile | Aldrich Chemical |
| IOA | isooctyl acrylate | 1 |
| FOA | perfluorooctyl acrylate | 3M Company |
| MAA | methacrylic acid | Eastman Kodak |
| IBOA | isobornyl acrylate | Alcolac |
| EOEA | 2-ethoxyethyl acrylate | Polysciences, Inc. |
| ODA | octadecyl acrylate | 2 |
| LA | lauryl acrylate | CPS Chemical |
| THFA | 2-tetrahydrofurfuryl acrylate | CPS Chemical |
| OACM | octyl acrylamide | National Starch |

| MONOMERS -continued | | |
|---|---|---|
| Abbrev. | Monomer | Source |
| HEA | 2-hydroxyethyl acrylate | Rohm and Haas |
| HPA | hydroxypropyl acrylate | Rohm and Haas |
| DMACM | N,N-dimethylacrylamide | Aldrich Chemical |
| CEA | β-carboxyethyl acrylate | Alcolac |
| NVP | N-vinyl pyrrolidone | GAF |
| HDDA | 1,6-hexanediol diacrylate | Sartomer |

1) Prepared by esterification of isooctyl alcohol (Exxon) with acrylic acid.
2) Prepared by esterification of octadecyl alcohol (Sherex) with acrylic acid.

Examples 1 Through 16 and Comparative Example 1

These Examples show the performance of a 100% silicone PSA generated from a 1/1.2 mixture of gum (35K ACMAS) and MQ resin (Comparative Example 1) and compare it to the performance of hybrid PSAs prepared by formulating 90 parts of this same gum/resin mixture with 10 parts of various vinyl monomers (Examples 1–16).

Comparative Example 1

A homogeneous 73.3% solids solution of silicone gum and resin (in a ratio of 1/1.2) also containing photoinitiator was prepared by adding 100 g of 35K ACMAS prepared according to the above-described method and 2 g (2 wt %) Darocur™ 1173 2-hydroxy-2-methyl-1-phenylpropan-1-one (available from EM Industries, Inc.) to 200 g of a 60% solids solution of MQ resin in toluene (available from GE Silicones as catalog # SR 545). A portion of this solution was knife coated at 2 mil thick onto a 37 micrometer thick primed polyester film with an unprimed polyester film overleaf. This laminate was exposed to UV irradiation at 2.6 mW/cm² (Sylvania Blacklight) for 10 minutes, the unprimed polyester removed, and the resulting tape dried 10 min at 65° C. After conditioning overnight at constant temperature (22° C.) and humidity (50% RH), the tape tests described above were performed. Results are shown in Table 1.

Example 1

12.35 g of the 73.3% solids solution (containing 9 g of solids) of the 1/1.2 35K ACMAS/MQ resin mixture (also containing photoinitiator) prepared in Comparative Example 1 was mixed with 1 g isooctyl acrylate (IOA). The resulting clear solution was coated, cured, and tested as described above for Comparative Example 1, with results presented in Table 1.

Examples 2 Through 7

Following the procedure of Example 1, clear solutions were prepared from 12.35 g of the 1/1.2 35K ACMAS/MQ resin solution and 1 g of perfluorooctyl acrylate (FOA) (Example 2), methacrylic acid (MAA) (Example 3), acrylic acid (AA) (Example 4), isobornyl acrylate (IBOA) (Example 5), 2-ethoxyethyl acrylate (EOEA) (Example 6), and acrylonitrile (ACN) (Example 7), coated, cured, and tested, with results presented in Table 1.

Example 8

Following the procedure of Example 1, a clear solution was prepared from 12.35 g of the 35K ACMAS/MQ resin solution and 2.2 g of a 45% solids solution of octadecyl acrylate (ODA) in toluene, coated, cured, and tested. Results are shown in Table 1.

Examples 9 Through 16

Following the procedure of Example 1, solutions were prepared from 12.35 g of the 35K ACMAS/MQ resin solution and 1 g of lauryl acrylate (LA) (Example 9), tetrahydrofurfuryl acrylate (THFA) (Example 10), t-octyl acrylamide (OACM) (Example 11), 2-hydroxyethyl acrylate (HEA) (Example 12), hydroxypropyl acrylate (HPA) (Example 13), N,N-dimethyl acrylamide (DMACM) (Example 14), 2-carboxyethyl acrylate (CEA) (Example 15), and N-vinyl pyrrolidone (NVP) (Example 16). The solutions of Examples 9–11 were slightly hazy and were coated and cured that way, and those of Examples 12–16 were hazy, and ethyl acetate (EtOAc) was added to clarify them, with 1 g EtOAc added to the solutions of Examples 12–15 and 2 g to that of Example 16, followed by coating and curing. Testing was conducted after drying and conditioning according to the procedure in Example 1, with results presented in Table 1.

Examples 17 Through 25

These examples show the effect of varying the silicone to vinyl monomer ratio at constant 1/1.2 35K ACMAS/MQ resin composition for the following acrylic monomers: a 9/1 mixture of IOA and AA (Examples 17–20), straight EOEA (Examples 21 and 22), and straight FOA (Examples 23–25). Examples 17–20 also demonstrate the use of more than one monomer for the vinyl component.

Example 17

A mixture of 75 g 35K ACMAS and 150 g 60% solids MQ resin in toluene was prepared. 9 g of this 73.3% solids solution (containing 6.60 g solids) was mixed with 1 g of a mixture prepared from 18 g IOA and 2 g AA. To the resulting clear solution was added 0.05 g Darocur™ 1173 initiator and the mixture coated, cured, and tested as described in Example 1. Results of the adhesive testing are shown in Table 2.

Examples 18 Through 20

Following the procedure of Example 17, the 73.3% solids 35K ACMAS/MQ resin solution was mixed with the 9/1 IOA/AA solution in the following ratios: 8 g (containing 5.87 g solids) to 2 g (Example 18), 6 g (containing 4.40 g solids) to 4 g (Example 19), and 4 g (containing 2.93 g solids) to 6 g (Example 20). After charging 0.05 g Darocur™ 1173 initiator, each was coated, cured, and tested as described in Example 1, with results shown in Table 2.

Examples 21 and 22

The 73.3% solids 35K ACMAS/MQ resin solution from Example 17 was mixed with 2-ethoxyethyl acrylate (EOEA) in the following ratios: 9 g (containing 6.60 g solids) to 1 g (Example 21) and 8 g (containing 5.87 g solids) to 2 g (Example 22). After charging 0.05 g Darocur™ 1173 initiator, each was coated, cured, and tested as described in Example 1, with results shown in Table 2.

Examples 23 Through 25

The 73.3% solids 35K ACMAS/MQ resin solution from Example 17 was mixed with perfluorooctyl acrylate (FOA) in the following ratios: 9 g (containing 6.60 g solids) to 1 g (Example 23), 8 g (containing 5.87 g solids) to 2 g (Example 24), and 6 g (containing 4.40 g solids) to 4 g (Example 25). This final formulation was hazy and 1 g of EtOAc was added to clarify it. After charging 0.05 g Darocur™ 1173 initiator, each was coated, cured, and tested as described in Example 1, with results shown in Table 2.

Examples 26 Through 29

These examples show the effect of varying the 35K ACMAS/MQ resin ratio while holding the ratio of total silicone to vinyl monomer (FOA) constant at 10/1. A 1/0.8 ratio of 35K ACMAS/MQ resin was obtained by mixing 5 g 35K ACMAS, 6.6 g 60% MQ resin in toluene (4.0 g solids contained), 0.10 g Darocur™ 1173, and 0.9 g FOA (Example 26). Similarly prepared were a 1/1 ratio (Example 27): 5 g ACMAS, 8.33 g resin solution (5 g contained), 0.11 g initiator, and 1.0 g FOA; a 1/1.2 ratio (Example 28): 2.5 g ACMAS, 5 g resin solution (3 g contained), 0.06 g initiator, and 0.55 g FOA; and a 1/1.4 ratio (Example 29): 2.5 g ACMAS, 5.8 g resin solution (3.5 g contained), 0.07 g initiator, and 0.6 g FOA. Each was coated, cured, and tested as described in Example 1, with results shown in Table 3.

Examples 30 Through 33

These examples show curing of a 3/1 silicone/IOA mixture (silicone being a 1/1.2 mixture of 35K ACMAS/MQ resin) in the absence of solvent, and the effect of curing in a swollen state by adding varying levels of cyclohexane. A 62.7% solids solution of MQ resin in IOA was prepared by diluting 440 g 60% solids MQ in toluene with 175.6 g IOA and distilling off toluene (166 g removed) at atmospheric pressure. 30 g of this (containing 18.8 g MQ resin and 11.2 g IOA) was mixed with 15.6 g 35K ACMAS and 0.46 g Darocur™ 1173 to yield a 3/1 mixture of silicone to IOA where the silicone is a 1/1.2 mixture of gum to resin. This (Example 30) was coated, cured, and tested as described in Example 1, with results shown in Table 4. 10 g portions of this mixture were also diluted with either 1.1 g (Example 31), 4.3 g (Example 32), or 10 g (Example 33) cyclohexane, coated and cured in this diluted state of 90, 70 and 50% solids, respectively. These were dried, conditioned, and tested as described in Example 1, with results shown in Table 4.

Examples 34 Through 42

These examples show the effect of substitution of low molecular weight di- or monofunctional silicones for some of the 35K ACMAS in a 9/1 silicone/FOA mixture (silicone being a 1/1.2 mixture of gum and MQ resin). 35K ACMAS was mixed with 5K ACMAS in the following ratios: 4.5 g 35K and 0.5 g 5K (Example 34), 4.0 g 35K and 1.0 g 5K (Example 35), and 2.5 g 35K and 2.5 g 5K (Example 36). Similar blends were made using either 10K ACMAS (Examples 37–39) or 13K ACMASmac (Examples 40–42) in place of the 5K ACMAS. 10 g of 60% solids MQ resin in toluene (6 g contained), 1 g of FOA, and 0.12 g Darocur™ 1173 were added to these blends and the resulting homogeneous solutions coated, cured, and tested as described in Example 1, with results shown in Table 5.

Examples 43 Through 47

These examples show the effect of substitution of low molecular weight di- or monofunctional silicones or both for some of the 35K ACMAS in a 9/1 silicone/vinyl mixture (silicone being a 1/1.2 mixture of gum and MQ resin, and the vinyl component being a 9/1 mixture of IOA and AA). 35K ACMAS was mixed with 10K ACMAS or 13K ACMASmac or both in the following ratios: 2.6 g 35K and 1.4 g 10K (Example 43), 2.6 g 35K and 1.4 g 13K mac (Example 44), 2.4 g 35K and 8.0 g 10K and 0.8 g 13K mac (Example 45), 1.6 g 35K and 1.2 g 10K and 1.2 g 13K mac (Example 46), and 1.2 g 35K and 1.4 g 10K and 1.4 g 13K mac (Example 47). 8.0 g (containing 4.8 g resin) of a mixture of 0.52 g Darocur™ 1173 in 48 g 60% solids MQ resin in toluene was added to each of the above blends. To 6.12 g of each of the resulting solutions (containing 4.5 g solids) was added 0.5 g of a 9/1 mixture of IOA and AA. The resulting homogeneous solutions were coated, cured, and tested as described in Example 1, with results shown in Table 6.

Examples 48 Through 52

These examples show the preparation of hybrid silicone/ vinyl PSAs where the cured adhesive further contains a tackifying resin for the vinyl component. A blend of 9/1 IOA/AA monomers was prepared by mixing 18 g IOA and 2 g AA. 4 g of this was used to dissolve either 0.4 g (10 PHR) or 0.8 g (20 PHR) Regalrez™ 3102, a partially hydrogenated aromatic tackifying resin from Hercules, Inc., or 0.8 g (20 PHR) Regalrez™ 1078, a fully hydrogenated aromatic tackifying resin from Hercules, Inc. (PHR= parts per hundred resin). These solutions were used together with the 73.3% solids solution of 1/1.2 35K ACMAS/MQ resin from Example 17 to prepare the following mixtures: 5.44 g (4 g solids) silicone solution and 1 g 20 PHR Regalrez™ 3102 solution (Example 48), 5.44 g silicone solution and 1 g 20 PHR Regalrez™ 1078 solution (Example 49), 5.44 g silicone solution and 1 g 10 PHR Regalrez™ 3102 solution (Example 50), 6.17 g (4.5 g solids) silicone solution and 0.5 g 10 PHR Regalrez™ 3102 solution (Example 51), and 3.4 g (2.5 g solids) silicone solution and 2.5 g 20 PHR Regalrez™ 1078 solution (Example 52). Solutions prepared with Regalrez™ 1078 (Examples 49 and 52) were clear, while those with Regalrez™ 3102 were hazy (Example 48) or slightly hazy (Examples 50 and 51). 0.05 g of Darocur™ 1173 was charged to each and the resulting solutions coated, cured, and tested as described in Example 1, with results presented in Table 7.

Comparative Example 2 and Examples 53 Through 60

These Examples demonstrate variation in silicone molecular weight for a given functionality and variation in functionality for a given silicone molecular weight, all prepared as 100% solids coating compositions utilizing MQ resin which has been dried of solvent.

Comparative Example 2

255 g of a 60% solids solution of MQ resin in toluene was placed in a 500 mL round bottom flask and stripped of solvent for two hours on a rotary evaporator (aspirator vacuum) at 60° C. The resulting solid was further dried on a high vacuum line at room temperature for four hours to yield 152 g of a brittle glass. 78 g of this resin was dissolved in a mixture of 46.8 g IOA and 5.2 g AA. 10 g of the resulting homogeneous solution was added to 5 g of 13K ACMAS and 0.15 g Darocur™ 1173 yielding a mixture that is 100% solids containing an 11 to 4 ratio of (1/1.2 13K ACMAS/MQ resin) to (90/10 IOA/AA). This was coated, cured, conditioned, and tested as described above in Example 1. Peel adhesion of the resulting tape was very low, as shown in Table 8, and the high crosslink density at this low molecular weight of the difunctional silicone lead to a rapid pop-off failure in shear adhesion testing.

Examples 53 Through 61

These Examples were prepared and tested using the same solution and procedure of Comparative Example 2, but substituting silicones of higher molecular weight as well as different functionalities. Results are shown in Table 8.

Example 62

This Example shows the use of a low level of multifunctional acrylate to enhance crosslink density in the acrylic phase. To 10 g of the acrylic/MQ resin solution from Comparative Example 2 was added 5 g 35K ACMAS, 0.1 g 1,6-hexanediol diacrylate (HDDA), and 0.15 g Darocur™ 1173. The resulting solution was coated, cured, and tested as described above in Example 1 and gave a tape with medium tack, 28.2 N/dm peel, and 10,000+ minutes shear.

Comparative Example 3 and Examples 63 Through 65

These Examples show that even a very low level of vinyl monomer can have a dramatic influence on the peel performance.

Comparative Example 3

25 g of 35K ACMAS was dissolved in 50 g of 60% solids MQ resin in toluene to yield a 73.3% solids solution with a 1/1.2 gum to resin ratio. 0.5 g Darocur™ 1173 was added and a portion was coated, cured, dried, and tested as described above in Example 1. Results are shown in Table 9.

Examples 63 Through 65

To 13.5 g (9.9 g solids) of the solution prepared above in Comparative Example 3 was added 0.1 g (1%) MAA (Example 63). Similarly prepared were mixtures of 13.0 g (9.5 g solids) solution and 0.5 g (5%) MAA (Example 64), and 12.3 g (9.0 g solids) solution and 1.0 g (10%) MAA (Example 65). Coating, curing, drying, and testing was conducted as described in Example 1, with results presented in Table 9.

Example 66

This Example shows the use of UV radiation from medium pressure mercury lamps to cure the adhesive. A portion of a mixture of 12.35 g (9 g solids) of the 73.3% solids 1/1.2 35K ACMAS/MQ resin solution from Example 17, 1.0 g of the 9/1 IOA/AA monomer mixture also from Example 17, and 0.1 g Darocur™ 1173 was coated onto primed polyester film with an unprimed polyester film overleaf as described in Example 1. The resulting laminate was cured by passing through a PPG Industries UV Processor five passes at 23 m per min with both lamps set at 80 watts/cm (200 watts/in) for a total dose of 500 mJ/cm$^2$. After curing, the unprimed polyester was removed and the sample dried, conditioned, and tested as described in Example 1. Results are presented in Table 10.

Example 67

This example demonstrates the use of a thermal initiator to cure the adhesive. A portion of a mixture of 6.17 g (4.5 g solids) of the 73.3% solids 1/1.2 35K ACMAS/MQ resin solution from Example 17, 0.5 g of the 9/1 IOA/AA monomer mixture also from Example 17, and 0.075 g t-amyl peroxy pivalate available from Pennwalt under the tradename Lupersol™ 554M75 was coated onto primed polyester film with an unprimed polyester film overleaf as described in Example 1. The resulting laminate was placed in a 65° C. forced air oven for 60 minutes. The unprimed polyester was then removed, and the sample dried, conditioned, and tested as described in Example 1. Results are presented in Table 10.

TABLE 1

90 Parts (1/1.2 35K ACMAS/MQ Resin) + 10 Parts Various Vinyl Monomers

| Example # | Monomer | Tack* | Peel (N/dm) | Shear** (minutes) |
|---|---|---|---|---|
| Comp. Ex. 1 | none | H | 74 | 10000+ |
| 1 | IOA | H | 88 | 212 po |
| 2 | FOA | H | 67 | 10000+ |
| 3 | MAA | M | 39 | 10000+ |
| 4 | AA | M | 48 | 8550 po |
| 5 | IBOA | L | 32 | 10000+ |
| 6 | EOEA | M | 80 | 10000+ |
| 7 | ACN | L | 24 | 3600 |
| 8 | ODA | M | 57 | 10000+ |
| 9 | LA | H | 60 | 120 |
| 10 | THFA | L | 54 | 10000+ |
| 11 | OACM | L | 14 | 10000+ |
| 12 | HEA | H | 70 | 10000+ |
| 13 | HPA | M | 46 | 10000+ |
| 14 | DMACM | L | 31 | 10000+ |
| 15 | CEA | H | 71 | 10000+ |
| 16 | NVP | L | 9 | 10000+ |

*wherein H = high; M = medium; L = low.
** po = pop-off failure.

TABLE 2

Variation in Silicone/Acrylic Ratio for (1/1.2 35K ACMAS/MQ Resin) and Either 90/10 IOA/AA, EOEA, or FOA

| Ex. # | Monomer | Silicone/Acrylic | Tack | Peel (N/dm) | Shear (Minutes) |
|---|---|---|---|---|---|
| 17 | IOA/AA 9/1 | 9/1 | H | 54 | 10000+ |
| 18 | IOA/AA 9/1 | 8/2 | H | 32 | 10000+ |
| 19 | IOA/AA 9/1 | 6/4 | H | 33 | 10000+ |
| 20 | IOA/AA 9/1 | 4/6 | H | 3 | 10000+ |
| 21 | EOEA | 9/1 | L | 10 | 10000+ |
| 22 | " | 8/2 | M | 60 | 10000+ |
| 23 | FOA | 9/1 | H | 55 | 10000+ |
| 24 | " | 8/2 | M | 56 | 10000+ |
| 25 | " | 6/4 | L | 5 | 10000+ |

TABLE 3

Variation in 35K ACMAS/MQ Resin Ratio at Constant 10/1 Silicone/FOA Ratio

| Ex. # | Gum/Resin | Tack | Peel (N/dm) | Shear (Minutes) |
|---|---|---|---|---|
| 26 | 1/0.8 | H | 33 | 200 |
| 27 | 1/1.0 | H | 48 | 10000+ |
| 28 | 1/1.2 | H | 63 | 10000+ |
| 29 | 1/1.4 | H | 78 | 10000+ |

TABLE 4

Curing Neat or Swollen with Cyclohexane 3/1 (1/1.2 35K ACMAS/MQ)/IOA Formulation

| Ex. # | Solvent % | Tack | Peel (N/dm) | Shear (minutes) |
|---|---|---|---|---|
| 30 | 0 | H | 67 | 29 |
| 31 | 10 | H | 60 | 28 |
| 32 | 30 | H | 66 | 109 |
| 33 | 50 | H | 64 | 213 |

TABLE 5

Substitution of Low Molecular Weight Difunctional Silicone or Monofunctional Silicone for a Portion of 35K ACMAS in 90/10 (1/1.2 gum/resin)/FOA Formulation

| Ex. # | Ratio | Gum | Tack | Peel (N/dm) | Shear (minutes) |
|---|---|---|---|---|---|
| 34 | 90/10 | 35K/5K | M | 72 | 10000+ |
| 35 | 80/20 | " | M | 70 | 10000+ |
| 36 | 50/50 | " | L | 69 | 10000+ |
| 37 | 90/10 | 35K/10K | H | 85 | 10000+ |
| 38 | 80/20 | " | M | 69 | 10000+ |
| 39 | 50/50 | " | M | 58 | 3330 po |
| 40 | 90/10 | 35K/13K macromer | H | 60 | 1130 po |
| 41 | 80/20 | 35K/13K macromer | H | 66 | 680 po |
| 42 | 50/50 | 35K/13K macromer | H | 65 | 275 |

TABLE 6

Substitution of Both Low Molecular Weight Monofunctional and Difunctional Silicone For a Portion of the 35K ACMAS in a 9/1 (1/1.2 gum/resin)/(9/1 IOA/AA) Formulation

| Ex. # | Ratio | Gum | Tack | Peel (N/dm) | Shear (minutes) |
|---|---|---|---|---|---|
| 43 | 65/35 | 35K/10K | H | 39 | 10000+ |
| 44 | 65/35 | 35K/13K macromer | H | 46 | 10000+ |
| 45 | 60/20/20 | 35K/10K/13K macromer | H | 36 | 10000+ |
| 46 | 40/30/30 | 35K/10K/13K macromer | H | 27 | 10000+ |
| 47 | 30/35/35 | 35K/10K/13K macromer | H | 32 | 10000+ |

TABLE 7

Tackification of Acrylic Phase

| Ex. # | Silicone/Acrylic | Resin* | Tack | Peel (N/dm) | Shear (minutes) |
|---|---|---|---|---|---|
| 48 | 8/2 | RR3102 20 parts | H | 64 | 10000+ |
| 49 | 8/2 | RR1078 20 parts | H | 73 | 10000+ |
| 50 | 8/2 | RR3102 10 parts | H | 68 | 10000+ |
| 51 | 9/1 | RR3102 10 parts | H | 60 | 10000+ |
| 52 | 5/5 | RR1078 20 parts | H | 78 | 10000+ |

*RR3102 = Regalrez ™ 3102 (partially hydrogenated aromatic tackifying resin available from Hercules, Inc.)
*RR1078 = Regalrez ™ 1078 (fully hydrogenated aromatic tackifying resin available from Hercules, Inc.)

TABLE 8

Variation in Functional Groups and Molecular Weight

| Ex. # | Silicone | Tack | Peel (N/dm) | Shear (minutes) |
| --- | --- | --- | --- | --- |
| Compar. 2 | 13K ACMAS | M | 7 | 12 po |
| 53 | 20K ACMAS | M | 36 | 10000+ |
| 54 | 35K ACMAS | M | 37 | 10000+ |
| 55 | 52K ACMAS | M | 35 | 10000+ |
| 56 | 35K MAUS | M | 26 | 10000+ |
| 57 | 35K MACMAS | M | 35 | 10000+ |
| 58 | 30K MeStUS | M | 24 | 10000+ |
| 59 | 35K ACMS | M | 24 | 10000+ |
| 60 | 20K MAHAS | M | 34 | 10000+ |
| 61 | 35K CACMS | M | 12 | 235 po |

TABLE 9

Addition of Low Levels of MAA to 1/1.2 35K ACMAS/MQ Resin

| Ex. # | % MAA | Tack | Peel (N/dm) | Shear (minutes) |
| --- | --- | --- | --- | --- |
| Compar. 3 | 0 | M | 63 | 10000+ |
| 63 | 1 | M | 91 | 10000+ |
| 64 | 5 | M | 70 | 10000+ |
| 65 | 10 | M | 63 | 10000+ |

TABLE 10

Medium Pressure UV or Thermal Cure

| Ex. # | Tack | Peel (N/dm) | Shear (minutes) |
| --- | --- | --- | --- |
| 66 | H | 66 | 10000+ |
| 67 | H | 64 | 10000+ |

We claim:

1. A pressure-sensitive adhesive formed from the free radical polymerization of a composition comprising:

(a) at least about 20 weight percent of polymer selected from the group consisting of polymers falling within the general formula

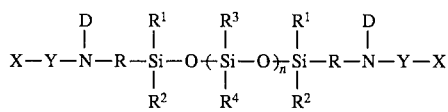 I and mixtures thereof, wherein:

X are monovalent moieties having ethylenic unsaturation which can be the same or different;

Y are divalent linking groups which can be the same or different and which serve to activate X toward free radical polymerization;

D are monovalent moieties which can be the same or different selected from the group consisting of hydrogen, an alkyl group of 1 to about 10 carbon atoms, and aryl;

R are divalent hydrocarbon groups which can be the same or different;

$R^1$ are monovalent moieties which can be the same or elected from the group consisting of alkyl and aryl;

$R^2$ are monovalent moieties which can be the same or different selected from the group consisting of alkyl and aryl;

$R^3$ are monovalent moieties which can be the same or different selected from the group consisting of alkyl vinyl, and aryl;

$R^4$ are monovalent moieties which can be the same or different selected from the group consisting of alkyl vinyl, and aryl; and n is an integer of about 200 to about 1000;

(b) about 0.5 to about 80 weight percent of monofunctional free radically polymerizable vinyl monomer which is capable of copolymerizing with said polymer; and (c) 80 to 200 parts per 100 parts by weight of element (a) of silicate MQ tackifying resin to impart a degree of adhesive tack to the cured composition at the use temperature;

wherein said weight percentages set forth in element (a) and element (b) are based upon the combined weights of said polymer of element (a) and said monomer of element (b).

2. The pressure-sensitive adhesive of claim 1 wherein said composition further comprises at least one of the additives selected from the group consisting of a filler, a nonpolar solvent, a multifunctional acrylate crosslinker, and a free radical initiator.

3. The pressure sensitive adhesive of claim 2, wherein said composition further comprises at least a nonpolar solvent and wherein said composition is cured in its swollen state.

4. The pressure-sensitive adhesive of claim 1 wherein said composition further comprises about 0.1 to about 5 weight percent of an initiator based upon the weight of said composition.

5. The pressure-sensitive adhesive of claim 4 wherein said initiator is a photoinitiator.

6. The pressure sensitive adhesive of claim 1 comprising the composition of claim 1 wherein X comprises

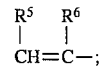

$R^5$ is selected from the group consisting of hydrogen and —COOH; $R^6$ is selected from the group consisting of hydrogen, methyl, and —CH$_2$COOH; n is an integer of about 200 to about 1000; R is selected from the group consisting of alkylene of one to about 12 carbon atoms, alkyl arylene, and arylene; $R^1$ and $R^2$ are independently selected from the group consisting of alkyl of one to about 12 carbon atoms, substituted alkyl of one to about 12 carbon atoms, aryl, and substituted aryl; $R^3$ and $R^4$ are at least 50% methyl with the remainder selected from the group consisting of alkyl of about 2 to about 12 carbon atoms, substituted alkyl of about 2 to about 12 carbon atoms, vinyl, aryl, and substituted aryl; and D is hydrogen.

7. The composition of claim 6 wherein n is an integer of about 200 to about 1000, R is alkylene of one to about 12 carbon atoms, and $R^1$, $R^{2 \; l}$, $^{R3}$, $R^4$ are methyl.

8. The pressure sensitive adhesive of claim 1 comprising the composition of claim 1 wherein X comprises

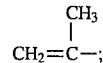

Y comprises

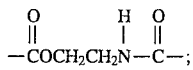

D=H;

R comprises —CH$_2$CH$_2$CH$_2$—; and

R$^1$, R$^2$, R$^3$, and R$^4$ each comprise —CH$_3$.

9. The pressure-sensitive adhesive of claim 1 wherein

X comprises CH$_2$=CH—;

Y comprises

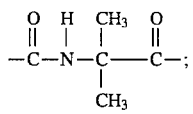

D=H;

R comprises —CH$_2$CH$_2$CH$_2$—; and

R$^1$, R$^2$, R$^3$, and R$^4$ each comprise —CH$_3$.

10. The pressure sensitive adhesive of claim 1 comprising the composition of claim 1 wherein X comprises CH$_2$=CH—;

Y comprises

D=H;

R comprises —CH$_2$CH$_2$CH$_2$—; and

R$^1$, R$^2$, R$^3$, and R$^4$ each comprise —CH$_3$.

11. The pressure sensitive adhesive of claim 1 comprising the composition of claim 1 wherein X comprises

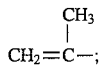

Y comprises

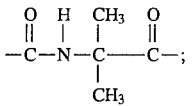

D=H,

R comprises —CH$_2$CH$_2$CH$_2$—; and

R$^1$, R$^2$, R$^3$ and R$^4$ each comprise —CH$_3$.

12. The pressure sensitive adhesive of claim 1 comprising the composition of claim 1 wherein X comprises

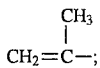

Y comprises

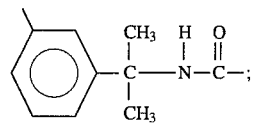

D=H,

R comprises —CH$_2$CH$_2$CH$_2$—; and

R$^1$, R$^2$, R$^3$ and R$^4$ each comprise —CH$_3$.

13. The pressure sensitive adhesive of claim 1 comprising the composition of claim 1 which further comprises about 2 to about 30 weight percent, based upon the total weight of said composition, of a compound of the formula

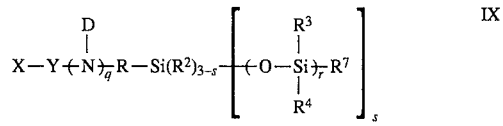

wherein:

q is an integer selected from the group consisting of 0 and 1;

s is an integer selected from the group consisting of 1, 2 and 3;

r is an integer of about 35 to about 700;

R$^7$ is a monovalent moieties which can be the same or different selected from the group consisting of alkyl, substituted alkyl, alkoxy, alkylamino, hydroxyl, aryl, and substituted aryl; and X, Y, D, R, R$^2$, R$^3$, and R$^4$ are as defined in claim 1.

14. The pressure-sensitive adhesive of claim 1 wherein said free radically polymerizable vinyl monomer is selected from the group consisting of acrylic acid, methacrylic acid, esters of acrylic acid comprising about 4 to about 21 carbon atoms, esters of methyacrylic acid comprising from about 5 to about 21 carbon atoms, acrylamide, N,N-dimethyl acrylamide, styrene, vinyl toluene acrylonitrile, methacrylonitrile, N-vinyl pyrrolidone, N-vinyl caprolactam, vinylidene chloride, vinyl esters of carboxylic acids, and mixtures thereof.

15. The pressure-sensitive adhesive of claim 1 wherein said free radically polymerizable vinyl monomer is selected from the group consisting of acrylic acid, methacrylic acid, acrylonitrile, esters of acrylic acid comprising from about 4 to about 21 carbon atoms, N,N-dimethyl acrylamide, N-vinyl pyrrolidone, and mixtures thereof.

16. The pressure-sensitive adhesive of claim 1 wherein said free radically polymerizable vinyl monomer is selected from the group consisting of acrylic acid, methacrylic acid, butyl acrylate, hydroxyethyl acrylate, hydroxypropyl acrylate, 2-carboxyethyl acrylate, ethoxyethyl acrylate, perfluorooctyl acrylate, isooctyl acrylate, and mixtures thereof.

17. The pressure-sensitive adhesive of claim 1 wherein the composition further comprises about 0.05 to about 2 weight percent of a multifunctional acrylate monomer based upon the total weight of said composition.

18. The pressure sensitive adhesive of claim 1 comprising the composition of claim 1 which further comprises about 5 to about 100 parts by weight tackifier per 100 parts by weight free radically polymerizable vinyl monomer.

19. The pressure sensitive adhesive of claim 1 comprising the composition of claim 18 wherein said tackifier is selected from the group consisting of rosin acids, rosin esters, synthetic aromatic resins, synthetic aliphatic resins, terpene resins, and mixtures thereof.

20. The pressure sensitive adhesive of claim 1 comprising the composition of claim 1 which further comprises inert gas bubbles dispersed throughout.

21. The pressure sensitive adhesive of claim 1 comprising the composition of claim 1 which further comprises microbubbles selected from the group consisting of glass microbubbles, plastic microbubbles, and mixtures thereof.

22. The pressure-sensitive adhesive of claim 1 wherein the composition further comprises about 0.5 to about 15 weight percent of silica filler based upon the total weight of said composition.

23. The pressure-sensitive adhesive of claim 1 wherein said composition further comprises about 2 to about 30 weight percent, based upon the weight of the adhesive composition, of polymer of the formula

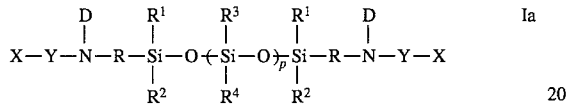

Ia wherein:

p is an integer of about 35 to about 199; and

X are monovalent moieties having ethylenic unsaturation which can be the same or different;

Y are divalent linking groups which can be the same or different and which serve to activate X toward free radical polymerization;

D are monovalent moieties which can be the same or different selected from the group consisting of hydrogen, an alkyl group of 1 to about 10 carbon atoms, and aryl;

R are divalent hydrocarbon groups which can be the same or different;

$R^1$ are monovalent moieties which can be the same or elected from the group consisting of alkyl and aryl;

$R^2$ are monovalent moieties which can be the same or different selected from the group consisting of alkyl and aryl;

$R^3$ are monovalent moieties which can be the same or different selected from the group consisting of alkyl, vinyl, and aryl.

* * * * *

UNITED STATES PATENT AND TRADEMARK OFFICE
CERTIFICATE OF CORRECTION

PATENT NO. : 5,514,730
DATED : May 7, 1996
INVENTOR(S) : Mieczyslaw H. Mazurek, Steven S. Kantner, David J. Kinning, and Yvan A. Bogaert It is certified that error appears in the above-identified patent and that said Letters Patent is hereby corrected as shown below:

Column 26, line 39, "toluene acrylonitrile" should read --toluene, acrylonitrile--.

Signed and Sealed this

Fourteenth Day of September, 1999

Attest:

Q. TODD DICKINSON

Attesting Officer     Acting Commissioner of Patents and Trademarks